(12) United States Patent
Baird et al.

(10) Patent No.: US 10,018,486 B2
(45) Date of Patent: Jul. 10, 2018

(54) INSTRUMENT ENCASING SYSTEMS

(71) Applicant: Phoenix Intl Marketing, LLC, Chicago, IL (US)

(72) Inventors: Kevin Baird, Chicago, IL (US); Barrie H. Bowen, Steyning (GB)

(73) Assignee: Phoenix Intl Marketing, LLC, Chicago, IL (US)

( * ) Notice: Subject to any disclaimer, the term of this patent is extended or adjusted under 35 U.S.C. 154(b) by 104 days.

(21) Appl. No.: 14/855,691

(22) Filed: Sep. 16, 2015

(65) Prior Publication Data
US 2017/0074690 A1 Mar. 16, 2017

(51) Int. Cl.
*G01D 11/24* (2006.01)

(52) U.S. Cl.
CPC .................. *G01D 11/24* (2013.01)

(58) Field of Classification Search
CPC .................................................... G01D 11/24
USPC ................... 73/178 R, 431; 29/729
See application file for complete search history.

(56) References Cited

U.S. PATENT DOCUMENTS

| | | | | |
|---|---|---|---|---|
| 5,380,206 A * | 1/1995 | Asprey | ............... | G04B 45/0061 368/228 |
| 6,508,192 B2 * | 1/2003 | Lentine | ............... | B63B 49/00 114/343 |
| 7,293,456 B1 * | 11/2007 | Trogdon | ............... | G01D 11/30 73/178 R |
| 7,406,004 B1 * | 7/2008 | Hiromori | ............. | G04B 47/046 368/228 |
| 7,997,789 B2 * | 8/2011 | Smith | ................ | G04B 37/127 368/228 |
| 8,381,585 B2 * | 2/2013 | Trogdon | ................ | G01D 11/30 73/178 R |
| 8,522,496 B2 * | 9/2013 | Boer | ..................... | B64C 1/1492 244/129.3 |
| 2008/0216579 A1 * | 9/2008 | Hoffman | ................ | G01D 13/04 73/708 |

\* cited by examiner

*Primary Examiner* — Lisa Caputo
*Assistant Examiner* — Jamel Williams
(74) *Attorney, Agent, or Firm* — Beem Patent Law Firm

(57) ABSTRACT

Improved instrument encasing systems may solve a variety of problems associated with existing systems. In one aspect, an improved instrument encasing system may include a suspension bracket and back plate that enable tool-less mounting and/or disassembly and/or security in mobile installations. Optionally, the system suspension bracket also may provide a template for easy alignment and selection of a mounting position and/or installation thereto. In some embodiments, the back plate may be temporarily reduced in diameter to enable quick and easy access to instruments mounted on an inner housing, or for access to the dial face for personalization. In another aspect, an inner housing of the instrument encasing system may provide one or more spring blades that receive instrument mounting sub-assemblies that provide for easy mounting and replacement of instruments. Optionally, stabilization weights also may be provided in the inner housing to absorb vibrations and increase the overall weight and stability of the housing, enabling lighter materials to be used in the manufacture of other components. In some embodiments, a Physical Vapor Deposition coating may be applied to an outer housing to provide various functional and/or aesthetic qualities.

19 Claims, 17 Drawing Sheets

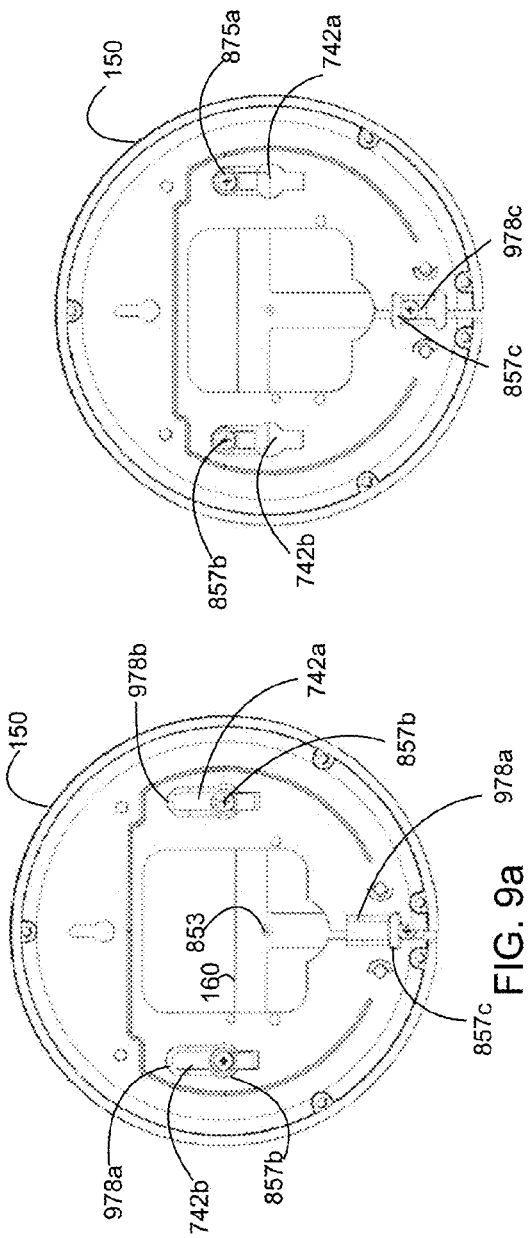

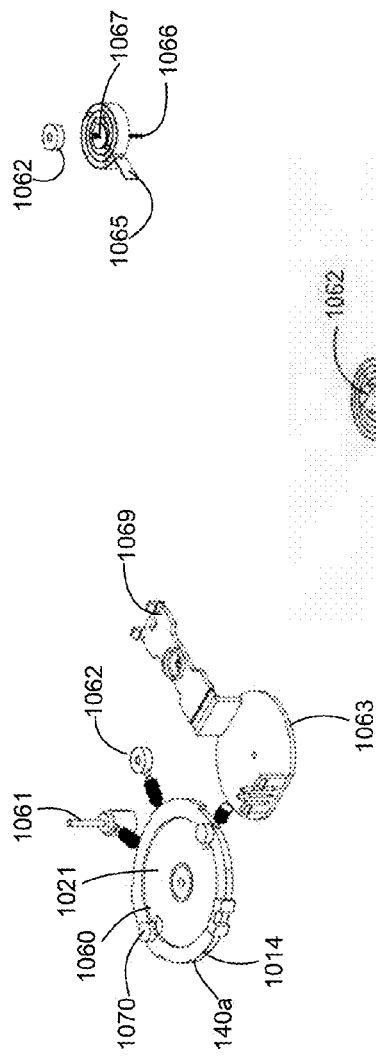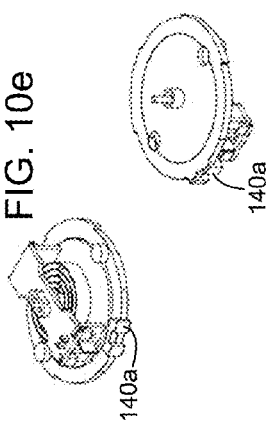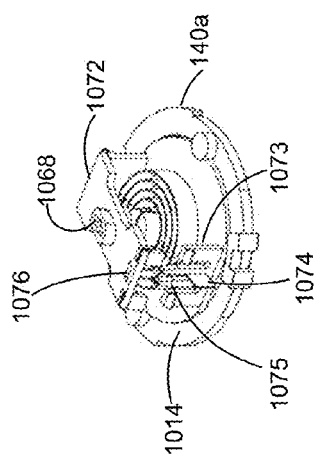

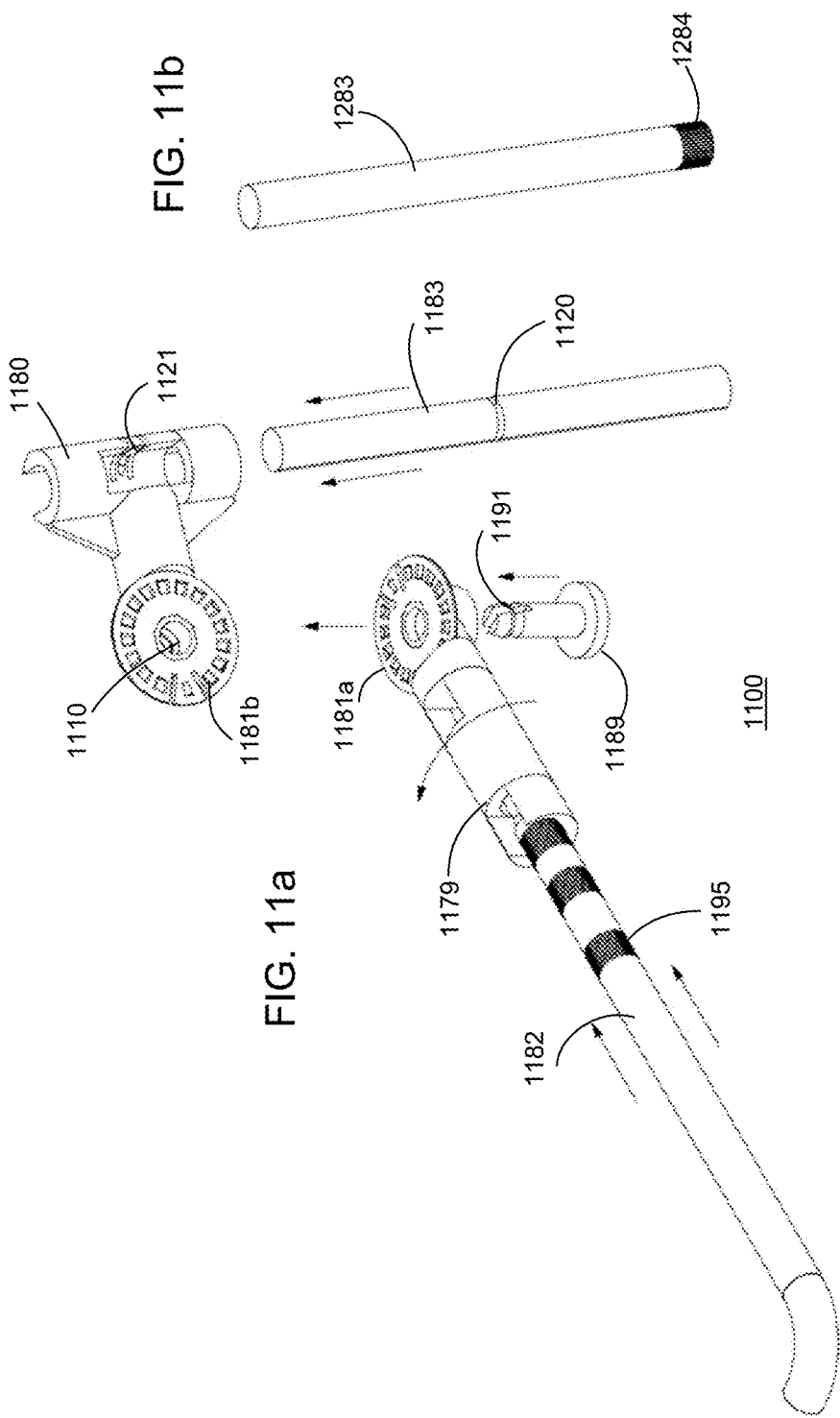

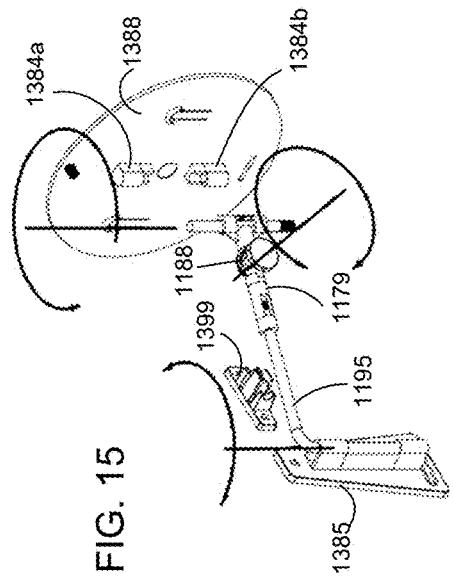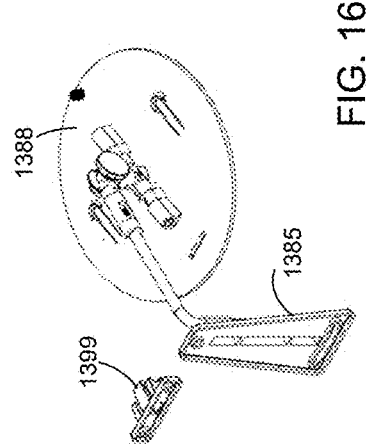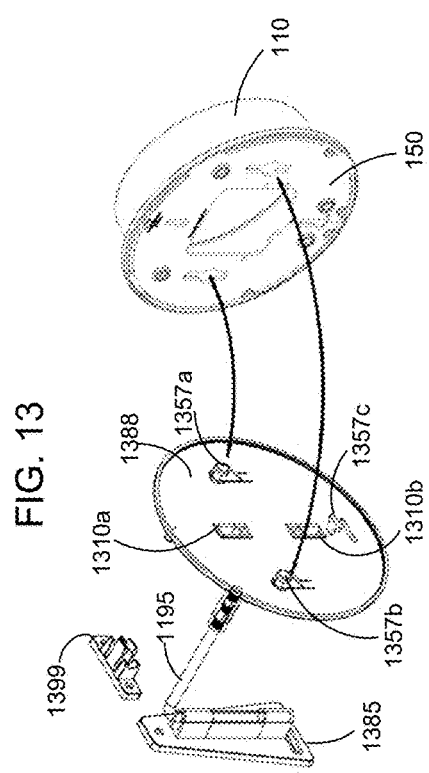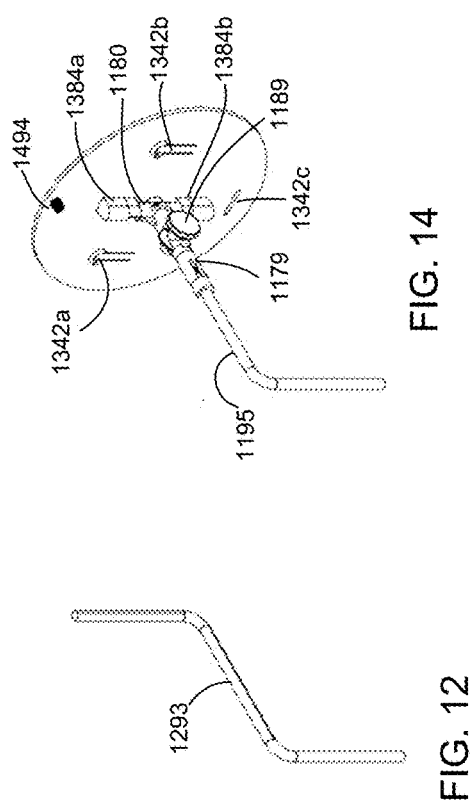
FIG. 15
FIG. 16
FIG. 13
FIG. 14
FIG. 12

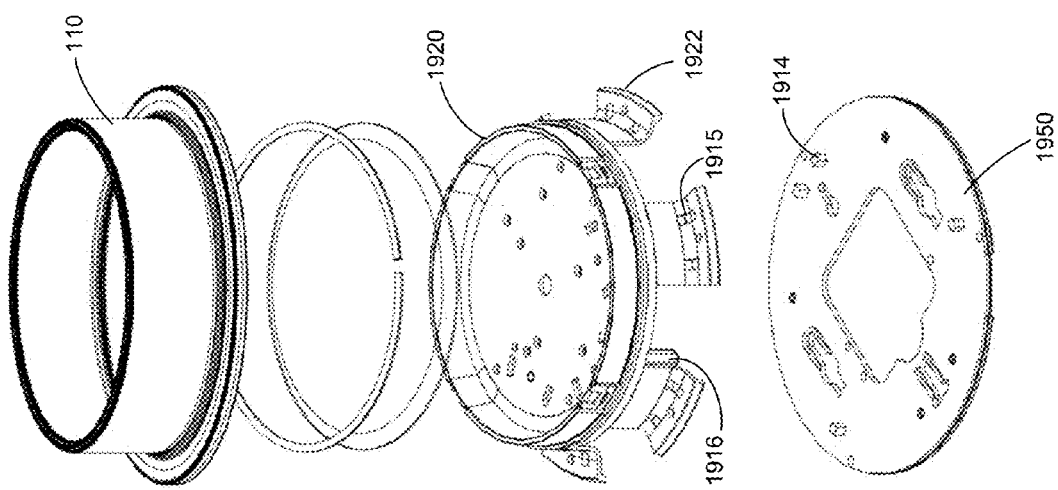
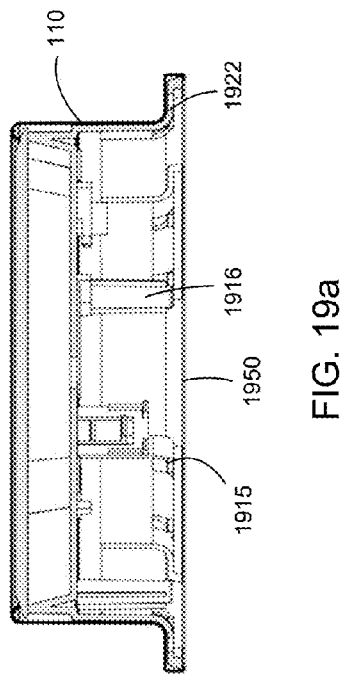
FIG. 19b
FIG. 19a

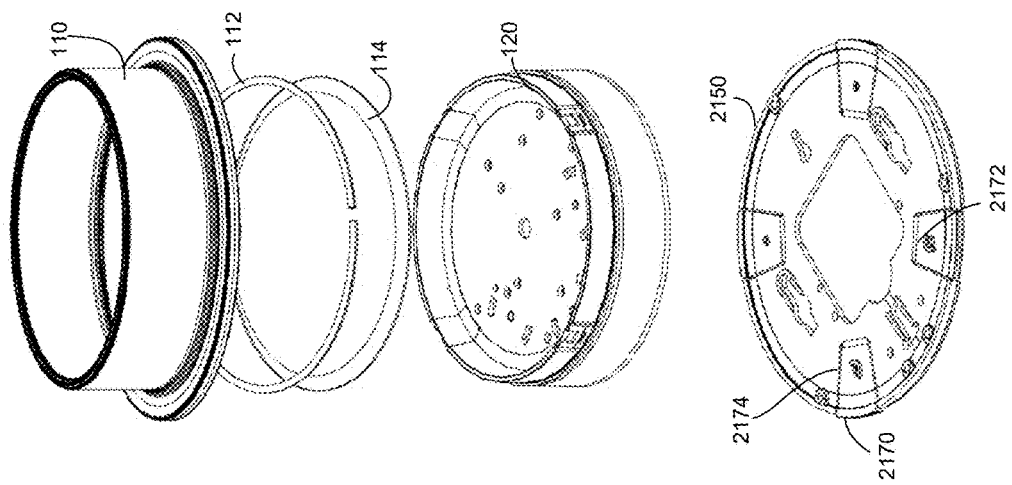
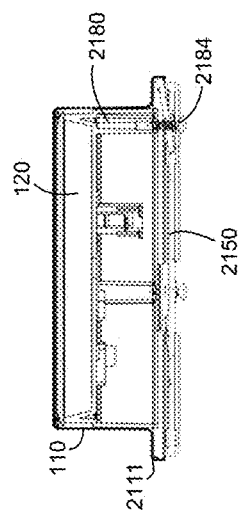
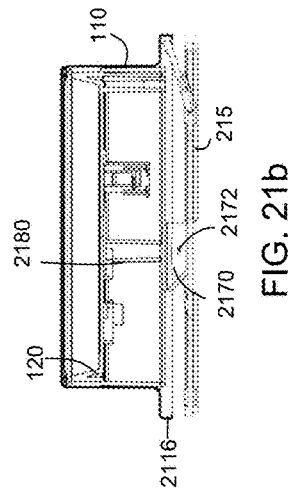

INSTRUMENT ENCASING SYSTEMS

RELATED APPLICATIONS

The present is related to a non-provisional patent application entitled "Systems And Methods For Instrument Encasing Systems" bearing Ser. No. 14/855,651 filed on the same date as the present application, the disclosure of which is hereby incorporated herein by reference. This related application is owned by the assignee of this present application.

BACKGROUND OF THE INVENTION

1. Technical Field

The present invention relates generally to the field of analogue gauge and accessory encasements, and more particularly, to instruments for mobile deployment in harsh outdoor marine, recreational, and horticultural locations as well as static industrial, domestic, and commercial usage sectors.

2. Related Art

Many gauge instruments such as clocks, weather instruments, speed logs, inclinometers and like used in, for example, the mobile sectors described above, are typically mounted to a wall, bulkhead or other appropriate surface in a variety of methods all of which have some disadvantages. For example, when instruments are deployed into moving platforms such as ships, yachts, power boats, mobile homes and the like, it is essential they be mounted securely and not left to swing on the single suspension point normally provided for in devices intended only for static deployment as the movement of the vehicle may cause the instrument to easily dislodge or fall and be damaged and/or be rendered inoperable.

The traditional analogue method of displaying a measured variable traces back in antiquity to the circular procession of the Northern Hemisphere invention of the Sun Dial. Thus, instrument casings historically have followed a particular design geometry of a circular drum type encasement housing a mechanism with a central indicating 'clockwise' procession of a hand or pointer directly derived from the shadow precession cast by the gnomon of the Sun Dial. Such drum type encasements have usually been arranged to have a rear flange having three or four equally spaced holes to enable screw mount from the front of the device. The simple drum and flange shape for clocks, chronometers, barometers and the like has been echoed by the style of pressure and temperature gauges and the like that became the norm from the early days of steam and the Industrial Revolution. With the advent of digital displays, the circular analogue drum and flange has been applied to an ever expanding plethora of gauge devices. Thus was established a whole traditional genre for fixed instrument design that has acquired something of a proscribed norm. But the rear flange has not been without its disadvantages particularly in their current evolution.

Instruments need to be removed for service such as battery change and resetting procedures. When flange screw mounted to a wall or bulkhead, removal requires the use of tools and any mishap such as a screwdriver escaping from the control of the screw slot will damage the surrounding case and wall areas. In addition, repeated removal and replacement results in screw holes gradually enlarging, thus rendering the mounting weak and eventually requiring a new position to be selected, which results in surface disfigurement. These situations become aggravated if there is a multiplicity of instruments mounted in similar fashion.

More sophisticated systems, such as the hinge bezel system, have been developed to overcome some of the flange screw disadvantages. In these system, a bezel provides an integrally cast hinge and closed locking screw latch device that hinges away from a wall mounted drum case with a back flange, to expose the instrument rear for service and reset functions. However, these systems are expensive to manufacture.

Often, traditional instrument encasing systems with a non-hinged but screw fitted bezel, have fully enclosed back plates permanently fixed to the case rear flange. These systems generally fail to provide adequate ventilation of the instrument casing and also make it difficult to access to the instrument housed therein.

It also is difficult to mark out a location for fixation of encasement system. Typically, the process usually involves placing and holding the cased instrument in the desired ultimate position and marking through the holes in the case flange. This can be an arduous and inaccurate process if not performed correctly and risks resulting in a misaligned attachment quite simply because one cannot simultaneously be close to support the device in situ and at a distance to visually align the device.

Traditional instrument encasing systems, especially those used in the harsh marine environment, usually are made of brass for a variety of reasons: brass is extremely tolerant of salt water laden air; brass does not corrode in the same way as steel, but has similar or adequate strength for most purposes; brass oxidizes—or 'tarnishes'—to a thin black brown film if left untreated, but does not rust away like mild steel; and the yellow color of brass retains a pleasing and highly acceptable aesthetic. In addition, brass does not spark if struck and is non-magnetic and thus does not distort instrument indications such as compasses and escapement chronometers. Therefore, cases and devices such as sextants, telescopes, dividers and the like that may be in proximity to compasses and chronometers also were traditionally made of brass or housed in brass for appearance, conformity, resistance to salt water laden air, durability and/or anti-magnetic property. However, it is difficult to maintain the appearance of brass's finish unless it is lacquered to inhibit tarnishing oxidation. Brass also has become an extremely costly, commoditized raw material due to the high demands for its copper constituent in the energy generation and transmission sectors and all manner of inductive electric actuators, printed circuits and wire conductors.

In the early 20th century, stainless steel became a universally recognized reality. However, this alloy has been slow to gain wide usage in harsh marine environments, typically in boat and ship building, where galvanic action can lead to corrosion of even 'stainless' steel. Thus the higher cost of stainless to normal steels becomes unjustifiable. Moreover stainless steel does not readily lend itself to traditional steel shipbuilding techniques where certain established art and skills can partially destroy some the attributes of the stainless alloy.

Protective coatings such as traditionally shellac, or more typically synthetic and epoxy lacquers, help to maintain brass and prevent tarnishing, but they are problematic and susceptible to chipping and scratching that locally exposes the protected brass to the atmosphere resulting in localized oxidation. Once surface penetration occurs, further degradation is inevitable and unpreventable as moisture penetrates the lacquer to brass interface, causing even more chipping and peeling, and consequently further oxidation.

Accordingly, a need has long existed for improved instrument encasing systems.

SUMMARY

In one aspect, an improved instrument encasing system may solve a variety of problems associated with existing systems. The improved instrument encasing system may include a suspension bracket and back plate that enable tool-less mounting and/or disassembly. The system suspension bracket also may provide a template for easy alignment and selection of a mounting position. The back plate may have a variable geometry, such as a temporarily reduced diameter, to enable screw-less and/or glue-less and/or other assisted assembly, and also enable quick and easy access for service or repair to instruments mounted on an inner housing. The inner housing may provide one or more spring blades that receive instrument mounting sub-assemblies that provide for easy mounting and replacement of instruments. Stabilization weights also may be provided in the inner housing to absorb vibrations and increase the overall weight and stability of the mounted housing, enabling lighter (such as plastics and the like) and/or higher cost and/or thinner gauge thickness materials (such as metals and the like) to be used in the manufacture of other components. The stabilization weights may be made of lower cost materials.

In another aspect, an analogue gauge instrument casing system may be deployed mounted onto a secure safe suspension system on mobile platforms within the marine, naval, and recreational realms and also may be repeatedly removed for service and replaced in situ, or relocated elsewhere all without the aid of tools and potential damage therefrom. The system also may function in static domestic, office or public areas, horticultural and workshop realms with an array of alternative and conventional suspension systems with or without a choice of mounting and security options in both static and mobile installations.

In another aspect, a mounting system for instrument encasing systems may enable indoor or outdoor static installation with several means of articulation to aid instrument visibility and also may have application in marine installations where it is anticipated this system can be used for providing attenuated lighting by means of installing a lamp system within the encasement in place of any gauge instrument.

In another aspect, the outer casing system may provide the traditional mirror polished or brushed appearance of metal encasements in a fashion resembling a yellow brass appearance, or introduce new harmonizing colors to surrounding design preferences, but utilize lower cost and/or superior corrosion resistant substrate materials, such as a suitable grade of stainless steel, aluminum or the like in place of brass. For example, the substituted material/substrate may be treated by a Physical Vapor Deposition (PVD) process to exhibit a superior hard and tarnish resistant yellow metal appearance or any other desired metallic color effect. In some embodiments where the instruments to be housed are not magnetically sensitive and/or the system is not likely to be mounted where it could otherwise distort compass readings, the substrate may be an austenitic or ferritic, such as ferromagnetic stainless steel.

Other systems, methods, features and advantages of the invention will be, or will become apparent to one with skill in the art upon examination of the following figures and detailed description. It is intended that all such additional systems, methods, features and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 8a-d show various views an exemplary suspension brackets for use in an instrument encasing system;

FIGS. 9a-b show perspective views of the exemplary suspension bracket of FIGS. 8a-d in combination with the exemplary back plate of FIG. 7a;

FIGS. 10a-f show perspective views of exemplary gauge mechanisms for use in an instrument encasing system;

FIG. 11a shows an exploded view and FIGS. 11b and 12 show perspective views of an exemplary clutch for a three-axis swivel plate for use in combination with an instrument encasing system;

FIGS. 13-16 show perspective views of exemplary three-axis swivel plates and brackets for use in combination with instrument encasing systems;

FIGS. 19a, 20a and 21a-b show cut-away views and FIGS. 19b, 20b and 21c show exploded views of additional exemplary back plates for use in instrument encasing systems.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting.

Figure 1:
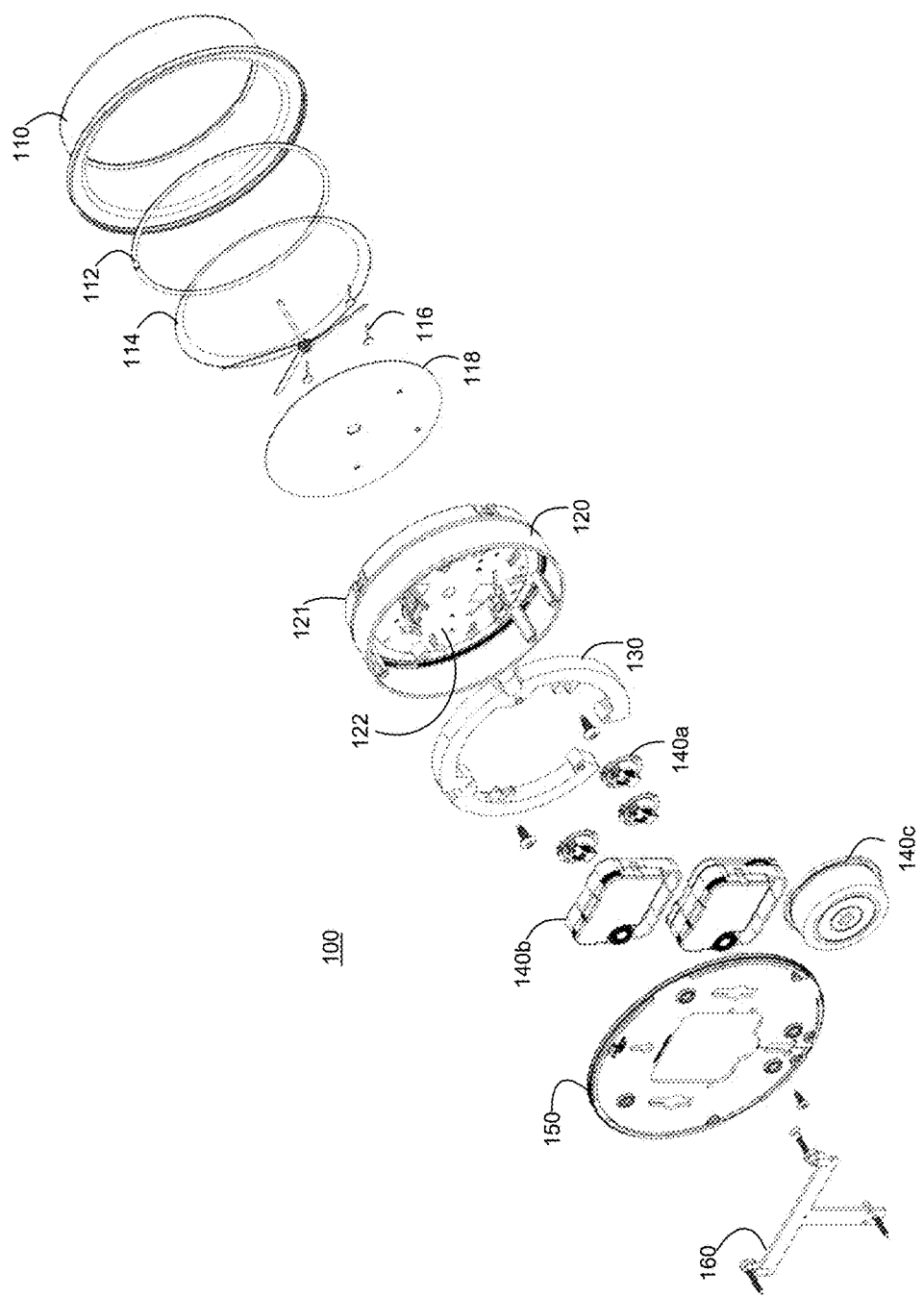
FIG. 1 shows an exploded view exemplary instrument encasing system.

Referring to the drawings, and initially to FIG. 1, an exploded view exemplary instrument encasing system 100 is shown. In the illustrated embodiment, the instrument casing system 100 may include an outer housing or casing 110 that contains an inner housing 120 and gauge mount plate 122 that may include one or more calibrated dials, gauges and the like 140a-c; a front lens 114; a lens compression support thread 112; a dial 118; indicating hands 116; one or more stabilization weights 130; a back plate 150, and a suspension bracket 160. The system may include more or less components.

The outer housing 110 may provide an exterior shell that houses the other components of the encasing system 100. The outer housing 110 may be made of a variety of materials, such as plastic or metal (such as steel, stainless steel, brass, copper, aluminum and the like). Other materials also may be used. Similarly, a variety of finishes may be applied to outer housing 110, such as decorative surface polishing and/or brushing with a high-durability protective lacquer, stove enameling of pigmented paints, electroplating, Physical Vapor Deposition (PVD) of metallic coatings, anodizing of aluminum, and the like. Other finishes also may be used.

Combining various materials and finishes, a variety of benefits may be provided. For example, the outer casing 110 (referred to in coating terms as the substrate) may be made of metal such as stainless steel or similar material that may provide anti-corrosion protection similar to a brass equivalent but at lower cost. In addition, a Physical Vapor Deposition (PVD) refractory metal compound coating designated as the target material may be applied to the metal outer casing, for example, to increase corrosion resistance and/or emulate the appearance of brass with a harder surface for improved durability and without the need for problematic protective lacquers.

PVD is a process that produces a metal vapor that can be deposited by condensation and freezing onto electrically conductive materials such as the outer casing 110 of FIG. 1, as a thin film of hard refractory material between about 1-6 microns thick, that is a highly adhered, pure metal or compound alloy coating that assume ceramic like properties of hardness and temperature durability. A PVD coating may also be applied to plastic moldings that are suitable for, and have been treated, with an electroplated surface to make the substrate electrically conductive. In this way, for example, the bezel 210 and outer casing 220 of FIG. 2 may also be PVD treated.

The coating compounds may made up of various elements such as carbides, nitrides, borides and silicides, the makeup of which varies according to application requirements. For example, a PVD coat of hard, non-tarnishing Zirconium Nitride (ZrN) for pale gold or brass tone may be applied to a white or grey metal outer casing. Alternatively, or additionally, PVD processing with Titanium Nitride (TiN), Titanium nitride (TiN) with Titanium carbon nitride (TiCN), Titanium Aluminum nitride (TiAlN), Chromium nitride (CrN), Aluminum Titanium nitride (AlTiN), Titanium Aluminum Carbon Nitride (TiAlCN), Aluminium Chromium Nitride (AlCrN) and the like also may be used where alternate colors and/or surface finishes are desired. In some embodiments, combinations of coatings may be used.

The color tone each target material produces on the substrate may be changed and/or varied, for example, by adding small amounts of oxygen, acetylene or nitrogen gases during the deposition. As a result, colors from black to chrome, blue to violet, green to gold and the like may be achieved.

The PVD coatings may surpass traditional electroplated coatings for hardness, abrasion, wear and/or resistance to corrosion, and may not easily tarnish, oxidize and/or discolor in harsh sun, salt water or humid environments typical of a marine environment. In addition, PVD coatings may not discolor or tarnish, and may not readily suffer color degradation or damage under extended UV light exposure, such as flaking, cracking or discoloration.

PVD Coating of the aforementioned target metal compounds (and others) may be used on various materials, such as stainless steel, aluminum, iron, porcelain and certain types of PVC and other thermoplastics. Unlike untreated stainless steel, which can fade and/or oxidize over time when exposed to a harsh environment, humidity and other factors, PVD coating a refractory metal may reduce and/or eliminate these effects.

In addition, a PVD coating may not level or fill like an electroplated or spray coat finish, leaving surface imperfections visible after the coating process. Thus, PVD coating is preferably applied to substrates having a polished or abraded surface, such as controlled engineered scratch patterned surfaces including ground, brushed or sand blasted surfaces.

In these various ways both traditional metal colors such as that pertaining to brasses, and many other colors may be incorporated onto superior and lower cost anti-corrosion metals, primarily but not exclusively, stainless steels, without the requirement for inferior and vulnerable surface coat protections.

Moreover, PVD coating of a stainless steel or aluminum substrate, unlike any other conventional surface treatment, may provide a durable, consistent and flexible process for a wide range of finish options and colors without the need for brass and at improved economies and/or environmental hazard concerns.

Figure 18B:
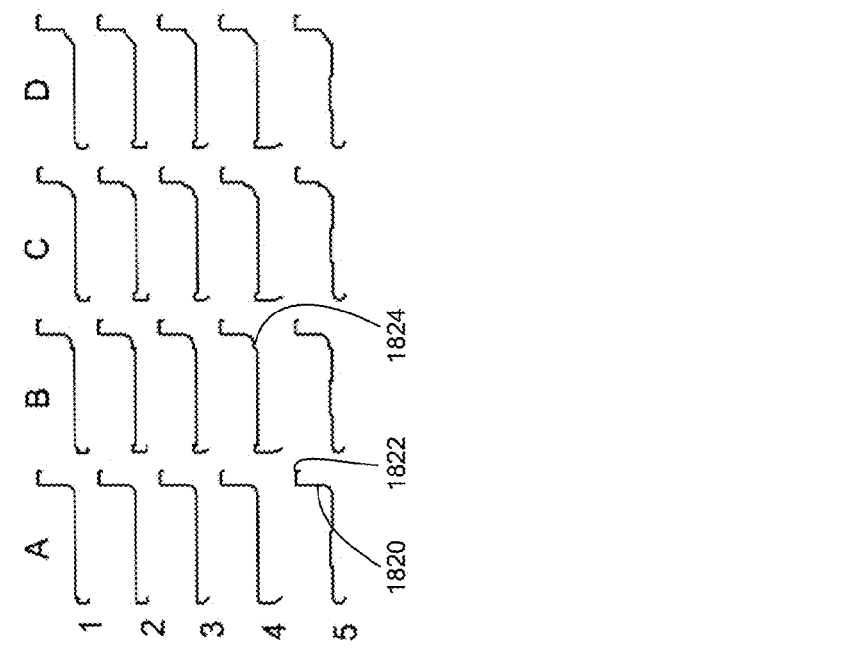
FIG. 18a-c show exemplary profiles for outer encasements for instrument encasing systems.
Figure 18C:
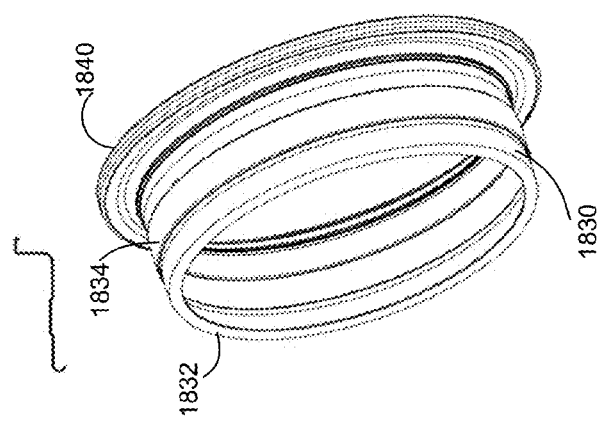
Figure 18A:
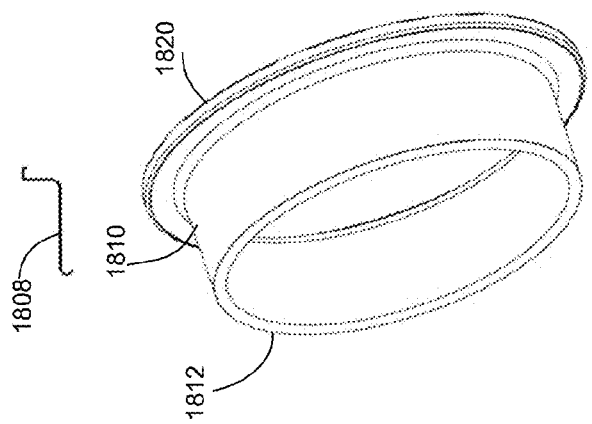

Referring also to FIG. 18a, an exemplary outer casing 110 may include a drum 1810 and a flange 1820. The drum 1810 may include a drum nosing 1812 that receives a leading edge 121 of an inner housing 120 as described herein. The flange 1820 may include a channel 1822 that receives a back plate 150 as described herein.

FIG. 18b show exemplary profiles for outer casings 110 for instrument encasing systems 100. As illustrated, twenty profiles A1 through D5 are modifications to the basic outer housing 120 shown in FIG. 18a. These adaptations have a rear flange 1820 having a reverse spun inward form for entrapment of the variable geometry back plate 150 (see, e.g., FIGS. 7a-b). These variations show various diagrammatic principles of mechanical and aesthetic appearance of how the basic outer case 110 could be adapted to represent a wide range of styles that could only be achieved in existing systems using more complex and costly casting and finishing procedures.

For example, secondary press and spinning tooling may be used to convert the basic profile of the drum in FIG. 18a into the other exemplary profiles shown in FIG. 18b that could only be achieved in traditional systems with a multiplicity of components. Using these techniques, the profiles shown in A1 through D5 may be produced as a single component.

As shown in FIG. 18b, rows one through five show various modified nosings 1812 that may be used. The nosing 1812 variations may be coupled, for example, with a stepped radius 1824 added to the flange 1820 as shown in profiles B1-B4. Further changes to the flange 1820 changes are shown in C1-C4 and D1-D4. In some embodiments, such as those shown in row five, the profiles of the outer casing 110 may include a waistline band 1834 that offers additional internal assembly possibilities for the instrument encasing system 100. As shown herein, the waistband 1834 may include a form that provides a similar function to the rear flange 1820 for the purposes of providing a component entrapment.

In some embodiments, the outer casing 110 may include holes (not shown) for receiving screws for security fixing. The screws may be, for example, wood screws, plastic screws, self-tapper screws for sheet materials, machine-cut, straight-thread screws for metal assembly and the like. The screws may be security screws that include, for example, a proprietary and/or uncommonly shaped head recess, such as a hexalobular internal driving feature and the like. Because the screw heads include distinctive and/or uncommon recesses, they may provide a security aspect because special drivers may not always be readily available. In some embodiments, the security screws may include head recesses styled similar to those of a TORX T and/or TORX TX, provided by Camcar Textron.

Referring again to FIG. 1, the lens compression support thread 112 may, for example, absorb tolerance variations in the assembled stack of components and also may provide pressure point dispersal to prevent breakage of the lens 114. The lens compression support thread 112 may be made of a variety of materials, such as a thread of closed cellular and the like. In some embodiments, the lens compression support thread 112 may be used in combination with a flat or bevel lens 114 in a metal outer casing 110. In other embodiments, the lens compression support tube may be used in combination with a bevel lens 114 housed in a plastic outer casing 110.

The system 100 may include a lens 114 that provides protection for the instruments 140*a*-*c*. The lens 114 may be made of glass, plastic or the like, such as mineral glass or clear plastic. The lens 114 may include beveled or flat edges. In some embodiments, the lens 114 may be provided with apertures for index, hand and setting knobs for barometers and other instruments 140*a*-*c*.

Figure 22B:
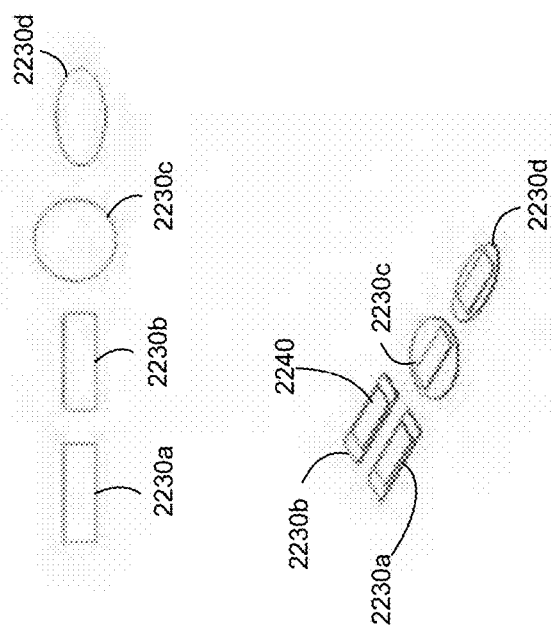
FIGS. 22a-e show an exemplary dial plate, exemplary personalization medallions, and exemplary guide templates for use in instrument encasement systems.
Figure 22C:
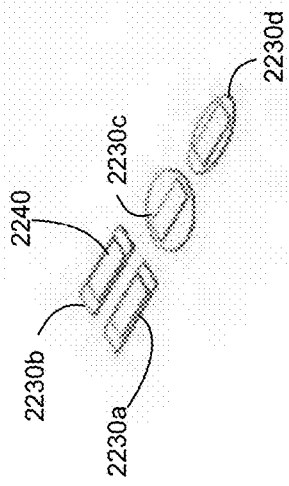
Figure 22A:
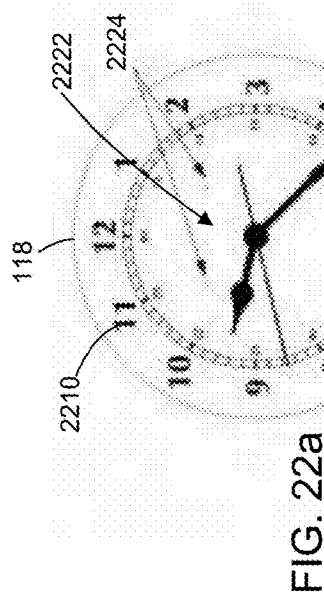
Figure 22D:
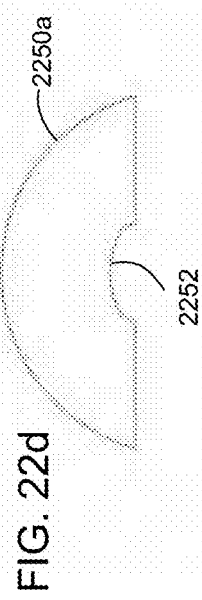
Figure 22E:
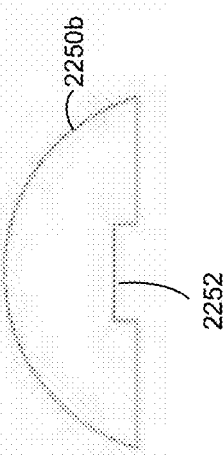

The dial 118 may be made of plastic, metal or the like, and may provide indicia 2210 that provide a backdrop including gauge indicia that provide a plurality of indicia that quantify the reading of an instrument as indicated by the indicating hands 116. The dial 118 may include holes for mounting the indicating hand 116. As shown in FIG. 22*a*, numerical indicia 2210 are provided for reading the hands 116 of a clock.

The dial 118 may also include one or more personalization areas 2222 that provide a space for placement of personalization medallion 2220. In some embodiments, the dial 118 may include one or more guide indicia 2224. The guide indicia 2224 may provide alignment points that act as visual guides for the placing of personalization medallions 2230 that enable the owner of the system 100 to easily add customization to the dial 118. The guide indicia 2230 may be part of or separate from the personalization space 2222. The medallions 2230 may be, for example, polished and lacquered brass and may be provided with a self-adhesive backing 2240 having a removable protective layer. The medallions may be a variety of shapes, such as the oval 2230*d*, rectangular 2230*a*-*b* and circular 2230*c* shapes shown in FIG. 22*b*. Other shapes may also be used. The medallions 2230 may be adhered to the dial 118 using the guide indicia 2224, such as by aligning the edges of the medallion 2230*a*-*d* on or near the guide indicia 2224.

Alternatively, or additionally, alignment templates 2250*a*-*b* may be provided to allow the user to easily align a medallion 2230*a*-*d* on the dial 118. The placement of personalization medallion 2230*a*-*d* also may be assisted, for example, because the various encasement systems 100 described herein enable a user to quickly and easily disassemble the system 100 by removal of the back plate 150, as described herein. In still another embodiment, the dial 118 may include a recess or groove that receives the medallion 2230*a*-*d*.

Returning again to FIG. 1, the inner housing 120 may provide a housing for mounting various instruments 140*a*-*c* exemplary housing 120 of FIG. 1 is shown in a partial perspective view in FIG. 4. The inner housing 120 is shown in FIG. 4 with half of the sidewall cut away to better illustrate the various internal components and to show how the various mechanisms are held in place.

In the illustrated embodiment, an instrument sub-assembly 140*a* (such as the one shown in FIG. 10) may include a disc clutch plate 1060 (FIG. 10) having cut away arcs 1014 (FIG. 10) for self-location astride the integrally molded spring blades 401, 402 and 403. As shown, there are three positions these mechanisms can assemble to, namely lower left spring blade 401, lower right spring blade 402 and bottom center spring blade 403. More or less spring blades 401, 402 and 403 may be provided.

Each sub-assembly 140*a* may be pre-located with the center shaft 417 entering holes 405 and with the sensing coil tail piece 1064 (FIG. 10) pointing to the top of the device 100. Each sub assembly 140*a* may then be rotationally aligned so that the profiles 1014 match to the arcs of the spring blades 401, 402 and 403 and pressed past the spring blades 401, 402 and 403 to complete the assembly 140*a* to inner housing 120.

In some embodiments, the inner housing 120 also may be arranged to retain other gauge mechanisms 140*b* aligned to the center hole 420 and constrained in situ by means of a set of arrays 410*a*-*b*, each having integrally molded spring blades 407, 408 and 409. This may enable various battery-operated quartz clock mechanisms from a variety of supply sources to be used since they all have the same fixation geometry. Other instruments also may be mounted to the inner housing 120 via the arrays 410*a*-*b*. For example, the lowest spring blade 407 of the arrays 410*a*-*b* may retain smaller instruments such as barometer mechanisms that may be located by shallow upstand 416 and the curved guide protrusions 415. Similarly, the middle spring blade 408 may clip retain medium sized instruments such as single function quartz clock mechanisms. Finally, the tallest spring blade 409 of the arrays 410*a*-*b* similarly may retain larger instruments such as dual function quartz clock mechanisms.

Apertures 430 may be provided in the transverse plate section of the housing 120 to enable various instruments, such as quartz clock mechanisms, aneroid barometer systems and the like, that do not have standard clip assemblies, to be screw mounted and/or mounted with dry self-adhesive membranes to the shallow upstand 416. Guide protrusions 415 may maintain a lateral center location for an instrument such as a quartz clock mechanisms that may be constrained by spring clips 407, 408 and 409.

The inner housing 120 also may locate and hold in place one or two stabilization weights 130. For example, a stabilization weight 130 may be retained with two large truss headed screws 440*a*-*b* screwed into bosses 412*a*-*b*. The location pegs 132 of the stabilization weights may be aligned with apertures 413 of the inner housing 120. The pegs may ensure the location pegs 132 absorb any sideways dynamic thrust the weight of the stabilization weight may exert on its screw fixings 134.

Figure 5B:
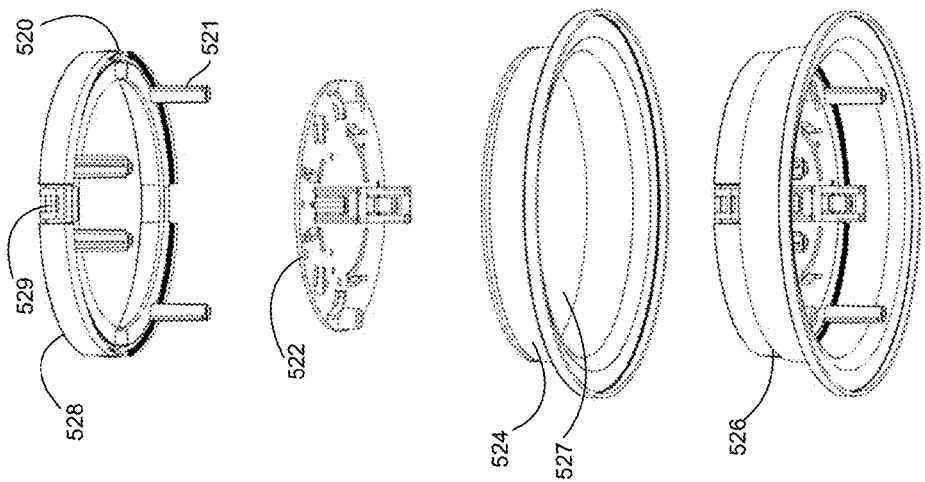
FIGS. 5a-b show exploded views of exemplary inner housings for use in an instrument encasing system.
Figure 5A:
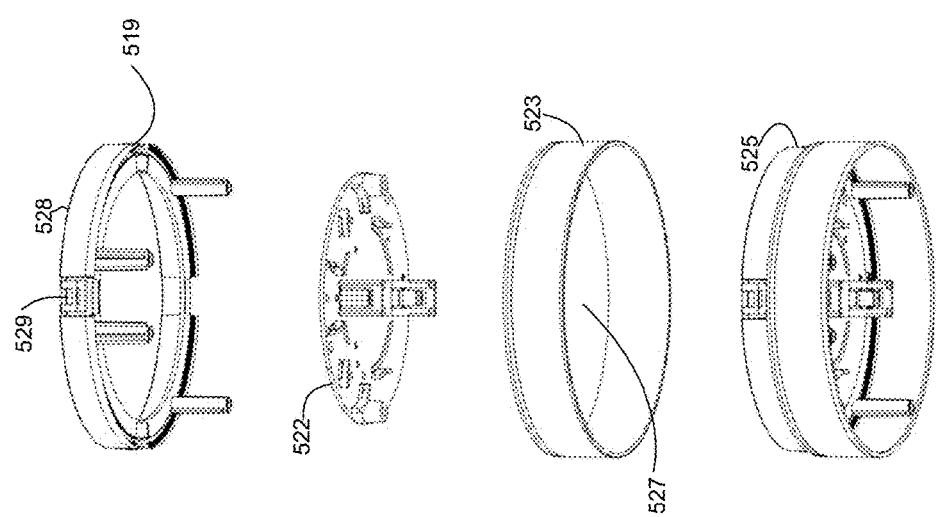

FIGS. 5a-b show an exploded view of an exemplary inner housing 120 for use in an instrument encasing system 100 is shown. The inner housing 120 is shown in FIGS. 5a-b in two possible versions and exploded to illustrate the variable possibilities that may be derived from one comprehensive injection mold.

In this embodiment shown in FIGS. 5a-b, the housings 120 may include front pieces 519 and 520, a pillar set 521, a gauge mount plate 522, and drum wall 523 and 524. In some embodiments, these elements may be homogeneously molded within a common injection mold chassis. Alternatively, each pieces may be separately manufactured and combined using known techniques. In some embodiments, the outer ring elements of the mold can be interchanged around a fixed and common center core and cavity forming the common center plate.

The front pieces 519 and 520 may provide a spacing 527 in which a gauge dial 118 may be placed and the relevant gauge instruments indicating hands 116 are free to rotate behind a flat or bevel lens 114 supported by the rim 528 of the front pieces 519 and 520. The front pieces 519 and 520 also may have an array of spring clips 29 that co-operate with the feature plastic bezel 209 (shown in FIG. 2) that has complimentary internal ribs that engage in a press fit assembly with clips 529.

Figure 2:
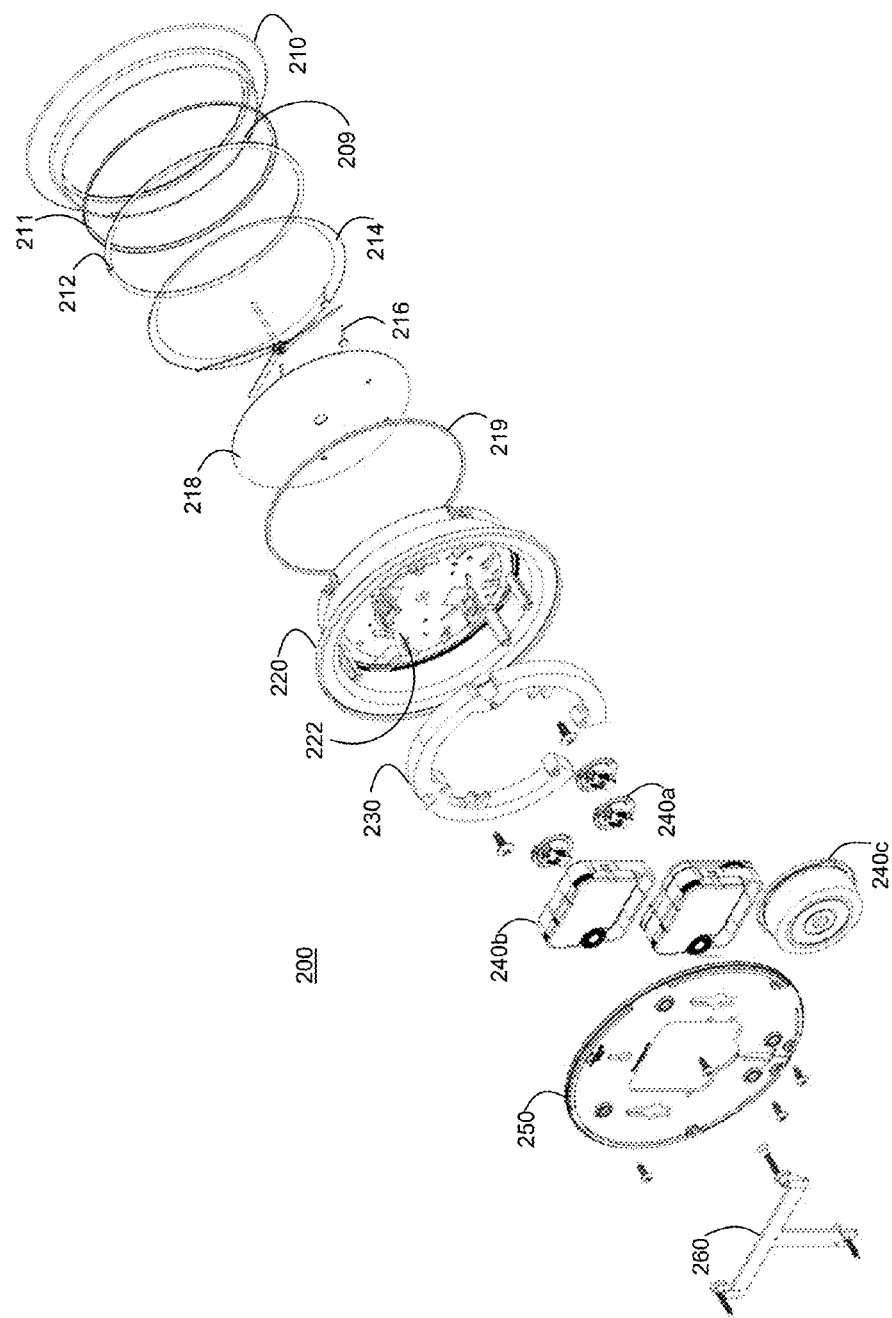
FIG. 2 shows an exploded view of another exemplary instrument encasing system.

The pillar set 521 may be provided to retain the back plate 120 in embodiments where the outer casing 110 does not include a nosing 2112 (FIGS. 21a-c) adapted to entrap the front piece 519 and 520. Such an embodiment is shown in FIG. 2. The gauge mount plate 522 may provide the spring blades 401, 402, 403, 407, 408 and 409 for mounting instruments 140a-c to the inner housing 120. Drum walls 523 and 524 may define the general shape of the housing 120 and may constitute the overall structure to contain front pieces 519 and 520, the pillar set 521 and the gauge mount plate 522.

The FIG. 5a housing 525 may be used inside other outer casings 110. In this embodiment, the front piece 519 and drum sidewall 523 may be varied in height and diameter within the mold parameters to perform all the known configuration constructions of instrument encasements for so called 'Fit-Up' units from 100 mm diameter to 180 mm diameter and 10 mm side depth to 50 mm.

The FIG. 5b may be used as part of a finished casing system 100 without the need for other external components to provide a cosmetic finish. For example, the housing 526 may be made with a choice of profile shapes possible by injection molding that are not possible by metal manufacturing means and also can vary in size from 100 mm diameter to 180 mm diameter and 10 mm side depth to 50 mm.

Figure 6A:
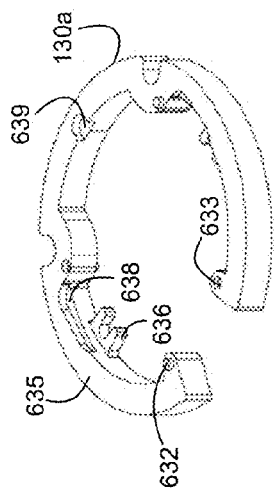
FIGS. 6a-c show perspective views of exemplary stabilization weights for use in an instrument encasing system.
Figure 6B:
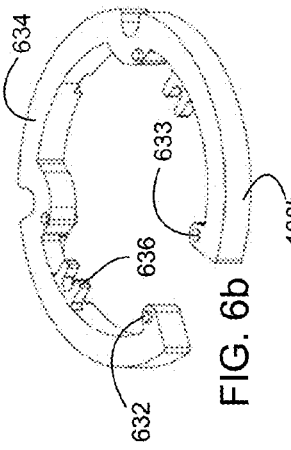

FIG. 6 shows a perspective view of exemplary stabilization weights 130 for use in an instrument encasing system 100. The weight 130 may have an open circle shape (reminiscent of a horseshoe). In some embodiments, the stabilization weight may be die cast from a material having an appropriate weight, such as a zinc alloy or the like. In some embodiments, the weight 130 may be arranged so that it can be assembled to the inner housing 120 as a single component.

Figure 6C:
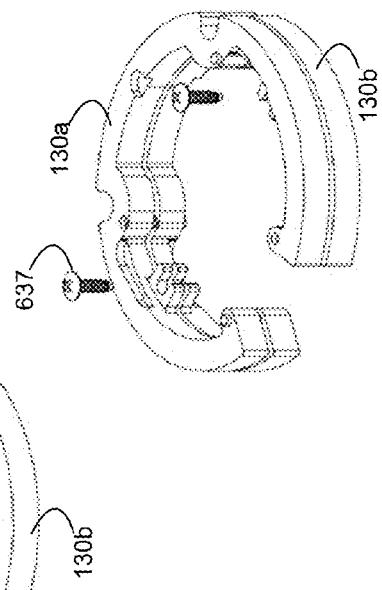

In other embodiments, two or more weights 130 may be provided. The weights 130 may be self-locating in one or more orientations. For example, the weights 130 may have two pairs of locating pegs 632 and two pairs of locating recesses 633 arranged as one pair of each on each of the upper 634 and lower 635 faces. The lower face 35 may be attached to the inside face of the inner housing 120. The pairs of pegs 632 and recesses 633 may be offset so that axially a locating peg 632 on one face is co-axial with a locating recess 633 on the opposite face. Such an arrangement may enable two components to be stacked lower face 635 to upper face 634 or upper face 634 to upper face 634 or lower face 635 to lower face 635, as shown in FIG. 6c.

This arrangement of pegs 632 and recesses 633 may allow for the U-shaped yokes 636 (fixing lugs) to be set flush to one face to permit a suitable screw boss 412a or 412b (FIG. 4) that may be molded integrally to the inner housing 120.

In some embodiments where two weights 130 are used, the weights may be stacked upper face 634 to upper face 634 so that the yokes 636 are in contact and mutually supportive within the axial loading of the fixing screws 637. In addition, the heads of the fixing screws 637 may lay coincident with the side clearance channels 638 of the lower face 635 and therefore clear of the heads of the suspension bracket 160.

A clearance 639 may be provided in the stabilization weight 130. The clearance 639 may be provided opposite to the open side of the open portion of the open circle and may provide clearance for a screw or hook when the housing 120 is mounted with a single suspension point in the back plate 150 (such as, for example, keyhole 741 in FIG. 7).

Referring again to FIG. 1, the back plate 150 may have a variable geometry, such as a temporarily reduced diameter, that enables quick and easy attachment and removal to/from the outer casing 110. When attached to the outer casing 110, the back plate 150 may enclose all components within the inner housing 120. In addition, the back plate may partially extend from the rear limit of the outer case 110 to control spacing from the wall mount surface for stability and ventilation, and to also co-operate with a suspension bracket 160, as described herein.

Figure 7A:
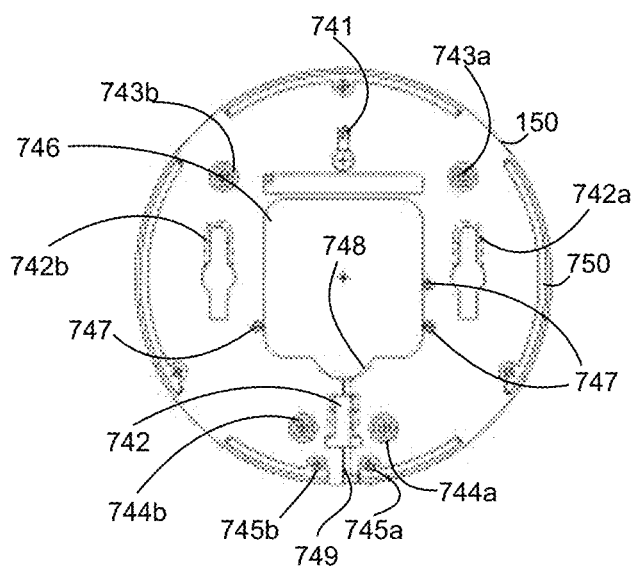
FIG. 7a shows a top view of an exemplary back plate or spring variable enclosure for use in an instrument encasing system.
Figure 7B:
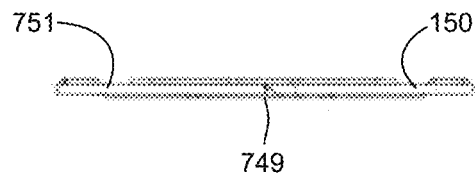
FIG. 7b shows a side view of the exemplary back plate or spring variable enclosure of FIG. 7a in a first configuration.
Figure 7C:
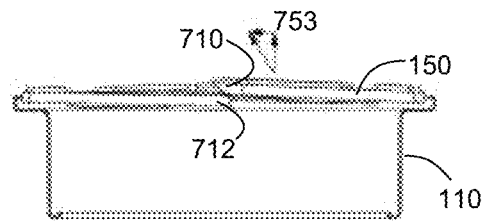
FIG. 7c shows a side view of the exemplary back plate or spring variable enclosure of FIG. 7a in a second configuration in combination with an exemplary outer casing.

An exemplary back plate 150 is shown in FIGS. 7a-c. The back plate 150 may provide various functions such as enclosing instruments 140a-c in the inner housing 120, providing an array of holes and shapes for suspension of the system 100, and providing adjustment access and battery replacement for the instruments 140 enclosed by the back plate 150. In some embodiments, the back plate 150 may be made of a semi-rigid material such as thermoplastic so as to enable compression of the back plate 150 to temporarily alter its geometry. For example, the diameter of the back plate 150 may be temporarily reduced by utilizing the flexural strength characteristics of thermoplastic material used and shape of the back plate. As such, the back plate 150 may provide efficiency and user convenience, aesthetic appeal and disassembly. The back plate 150 also may provide controlled ventilation of the instruments 140a-c.

In one embodiment, alteration of the geometry of the back plate 150 may be achieved by forcibly squeezing the back plate 150 via holes 745 across a radial slot or split line 749. One side of the split line may be chamfered at an angle to cause one side of the split to ramp up 710 over the opposite face 712 in a shallow helical distortion. This is illustrated in FIG. 7C by the resolved triangle of forces 753. A horizontal force applied toward the center line from the right side of the back plate 150 at aperture 745a may resolve in an upward vertical and diametric movement of the right side of the slot leftwards and past the center line. Conversely a horizontal force applied toward the center line from the left side at aperture 745b may resolve in a downward vertical and diametric movement of the left side of the slot rightwards and past the center line. This action may be made possible by the center void 746 and slot 749 that together release some of the stress integrity of the plate 150 to enable a controlled distortion. The reduced size that occurs across the horizontal diameter may be sufficient for the plate to be inserted into the circumferential groove 752 of the outer casing 110, which may have a similar proportion to the normal relaxed size of the back plate 150. Removal of the back plate 150, such as for service or the like, may be a reverse of the insertion process.

In other embodiments, the back plate 150 may be used to enclose the rear of instrument housings 110, 210, 310, 120, 220 or 322. The combined outer housing and inner mounting details of housing 220 may be produced by a thermoplastic molding process, where entrapment grooves or channels may be impractical or impossible to manufacture. In these embodiments, a screw holes 743 and 744 (FIG. 7) may be provided and the back plate 150 may provide instrument enclosure and/or single or dual point suspension. Screw holes 744 may provide multiple benefits, namely, they may combine with holes 743 to achieve a balanced fixation of the plate to a molded case and/or may provide rotational locking of the back plate 150 to the internal dial plate 118 thus maintaining the registration of suspension to the dial printing affixed to the front face of the dial plate 118. Small, semi-circular walls 777 (FIG. 9*a*) also may be provided to provide rotational registration of the back plate 150 to inner housing 120 by being placed astride the lower screw pillars of the inner housing 120 (as shown in FIG. 1).

The back plate 150 may provide for one or more of various suspension methods. For example, a keyhole 741 may be provided for use with a conventional suspension whereby a screw or cup hook inserted in a wall or other appropriate vertical surface may offer a straightforward suspension suitable in static installations. Two larger slots 742, which may be of a similar keyhole shape, also may be provided for a dual point suspension utilizing a T-bracket suspension system as shown in FIGS. 8 and 9. These dual suspension points of a keyhole derivative allow for installation in mobile and unstable situations such as boats and recreational vehicles. The dual suspension may reduce and/or prevent the instrument encasing system 100 from otherwise swinging, as would be expected with a single point suspension.

Apertures 746, 747 and 748 may be provided for access to internal calibration screws of the various instruments 140*a-c* that may be mounted on the inner housing 120. For example, a rounded corner square 746 may be provided to enable access for a quartz clock time reset and battery replacement. A semi-circular extension aperture 748 may allow access to the time adjustment of other clock devices such as mechanisms for indicating inshore tide times and the like. Five shallow circumferential walls 750 may be provided to align the back plate 150 and all parts affixed thereto in stable and parallel installation against the suspension surface. Five gaps 751 between the five walls 750 may permit easy convection airflows across the rear of the device and into the internal parts where temperature and humidity may be measured in some versions or, in outdoor applications, to reduce and/or eliminate any moisture or condensation disbursement and to reduce and/or eliminate the accumulation of mold, verdigris and oxidation.

In some embodiments, two screw holes 744 may be provided to enhance rigidity. In such an embodiment, two screws may be used to fixedly attach the back plate 150 to the inner housing 120.

FIG. 8*a-d* show various plan and perspective views of exemplary suspension brackets 160 and 860 for use in an instrument encasing system in combination and FIGS. 9*a-b* show perspective views of the exemplary the back plate 150 both pre- and post-installation with respect to suspension bracket 160.

In some embodiments, the suspension bracket 160 may be a triple screw head mount system extending in substantially the same axis as the cased instrument 140*a-c* such that triple headed tubes 857*a-b* and T-bar boss 857*c* are able to provide support and retention to the cased instruments 140*a-c* in a fixed and predetermined aligned aspect. A two-point suspension bracket 860 also may be used.

The suspension brackets 160 and 860 may be made of thermoplastic or other materials and may be molded in a family mold with the back plate 150, for example, to ensure finish and color match. The suspension bracket 160 may include a central bar 854. In the center of the lower edge, an aperture 853 may be provided. The bracket 160 may also include one or more bosses 857*a-c* that may be provided at the ends of the bracket 160. The bosses 857*a-c* may engage keyholes for the suspension of wall hanging items.

In the illustrated embodiments, two bosses 857*a-b* may be used to provide a non-swinging dual suspension for installations in moving platforms such as boats, yachts and recreational vehicles. The bosses 857*a-b* may be tubular with a countersink profile to receive appropriate countersink or oval head screws 858. The screw positions to fix the suspension bracket 160 to a wall surface may be coincident with the instrument suspension bosses 857 so that the suspended weight is directly in shear with the screws 858 via the tubular holes in the bosses 857*a-c*. This arrangement may reduce and/or eliminate any torsional movement in the suspension bracket 160 horizontal bar that may lead to possible fracture and/or failure or dislodgement of the suspended system 100 under certain dynamic circumstances.

In some embodiments, the design of the suspension bracket 160 also may enable it to be used as a marking out template for mounting the system 100. For example, an aperture 853 or 'Vee' groove 856 may be aligned with the desired location for the center of the system 100. By setting a small pencil marked center point and a horizontal line slightly below in the chosen mounted position, the installer may align the aperture 853 or 'Vee' groove 856 on the center point and may align the bar 854 with the horizontal line. Next, marks may be made through the screw tubes in the bosses 857*a-c* and onto the mount surface. The bracket 160 may then be removed, the screw holes drilled and the suspension bracket 160 may then screwed into position ready to suspend the whole system 100.

In some embodiments, the back plate 150 may include small semi-circular walls 77 to provide rotational registration of the back plate 150 to the inner housing 120 by being placed astride the lower screw pillars of the inner housing 120, as shown in FIG. 1. The back plate 150 also may include surrounds 978*a-b* to the dual suspension slots that are shaped as, for example, a ramp and plateau that permit the two headed screw holes 857*a-b* of the suspension bracket 160 to gradually tighten to the back plate 160 as the instrument is lowered into position on the dual suspension bracket. A third similar ramp 978*c* may be located on each side of the lower central inverted 'T' slot. A lower slot 978*c* to back plate 150 may receive a 'T' shaped upstand 857*c* on suspension bracket 160. The lower slot 978*c* may provide a variety of functions. First, the engagement of the 'T' bar 857*c* in the inverted 'T' slot 978*c* may provide rotational constraint that reduces and/or eliminates any vibrational oscillations of the whole assembly about the two upper headed tube bosses 857*a-b*. Second, the 'T' bar 857*c* and inverted T' slot 978*c* in conjunction with the two upper headed tube bosses 857*a-b* may hold the whole assembly in parallel relation to the wall mount surface such that the walls 750 are all maintained in permanent wall contact, ensuring a substantially parallel and/or substantially rattle-free installation. Third, the ramps of the lower 'T' slot 978*c* may permit the 'T' bar 857*c* of the suspension bracket 160 to gradually tighten to the back plate 150 as the whole instrument is lowered into position. Other arrangements may be used to produce a similar effect.

FIGS. 10*a-f* show perspective views of an exemplary gauge mechanism 140*a* for use in an instrument encasing system 100. As described above, the gauge mechanism 140*a* may be attached to the inner housing 120 at predetermined locations and enclosed by the back plate 160. The gauge mechanism 140*a* may comprise four moldings produced as a 'family' mold, namely a clutch plate 1060, a center shaft 1061, a rear bearing insert bush 1062, and a coil housing 1063. In some embodiments, bi-material Asian laminate sensor coils 1064 may be mounted on the molded shaft 1061. Alternatively or additionally, a European coil and shaft system 1065 may be provided that utilizes a brass shaft 1066 and a brass hub 1067 to which the coil 1068 may be mounted. In such an embodiment, a bearing insert 1062 may be used to support the back end of the brass shaft 1066 in place of the plastic shaft 1061. The rear bearing insert bush 1062 may be inserted into the rear bearing nacelle 1069 on the folding limb of the coil housing 1063. Other types of coils, such as bi-material coils that are sensitive to temperature and/or air moisture and the like, also may be used.

The sensing coil 1064 of the coil assembly may utilize the inherent spring tension of the innermost turn and a blade formed of the coil across the transverse center line of the coil to force fit to a diametric slot in the molded shaft 1061. In contrast, the innermost coil turn of sensor coil assembly 1065 may be riveted between opposing flanges of a brass hub 1068. In this arrangement, a metal shaft 66 may be pressed fitted to a hole passing through the hub 1068.

A clutch plate 1060 may be profiled with three arc locations 1014 (as shown in FIG. 10*d*) to self-locate into three locations 401, 402 and 403 of the inner housing 120 (as shown in FIGS. 4 and 5). The clutch plate 1060 may retain the coil housing 1063 by way of two molded shear entrapments 1070.

The coil housing 1063 may utilize the inherent elasticity of the thermoplastic material to flex and so be forced to slide into the clutch plate 1060 under the molded entrapments 1070 (as shown in FIGS. 10*a*, 10*d* and 10*e*). As the coil housing 1063 slides into the clutch plate 60, an angle of between about 1° to about 10° (preferably between about 1° to 5° and in one embodiment about 2°) may temporarily develop between the coil housing 1063 and the clutch plate 1060. The coil housing 1063 then may clip into the recess molded to the clutch plate 1060 and remains constrained with one axis of freedom, namely to rotate clockwise and counter clockwise under the control of a pressure friction between the two components.

The coil housing 1063 also may cause the limb forming the rear bearing nacelle 1069 to fold through an arc of about 180° (as shown in FIG. 10*d*) via a thin membrane hinge 1072 and may lock in situ onto ramp clips 1073 (as shown in FIG. 10*d*) to form a constraining enclosure or housing for the coil and shaft assembly 1064 or 1065 to rotate within. As should be apparent to one of ordinary skill in the art, this one-piece folding and locking molding may replace more expensive and complicated dual bearing systems for a shaft that require a two plate assembly plus any mixture of pillars, screws, rivets and the like.

The outer most coil turn of the sensing coil may be formed to a line radially coincident to the center of the coil to create a radial tailpiece anchorage 1074. This tailpiece 1074 may be caused to lay between two bendable cheek limbs 1075 that may be formed between the ramp clips 1073 (as shown in FIG. 10*d*). The space between the two cheek limbs 1075 may be formed by a narrow blade in the mold.

In some cases, the blade in the mold may be manufactured to be thicker than desired to leave an excess gap for the coil tailpiece 1074. As a result, motion may be lost in the slot that can result in inaccurate readings. This may be overcome by closing the gap as the rear limb 1069 of the coil housing 1063 is closed past the ramp clips 1073 when the slot 1076 engages the extensions of the cheek limbs 1075. Because the slot width 1076 is narrower than the overall width across the cheek limbs 1075, the cheek limbs 1075 may be forced to close the gap surrounding the coil tailpiece 1074.

To complete the assembly of the instrument, the gauge mechanism 140 may be fitted to one of the positions 401, 402 or 403 of the inner housing 120, an appropriate dial 118 may be fitted to the front face of the same housing 120, and an indicator hand 116 may be press fitted to the shaft 1061 or 1066 that is visible from the front dial face as it presents through the inner housing 120 to the front of the dial 118.

The rear of the coil housing 1063 folding limb 1069 may include a centrally molded slot 1068 that may receive a small instrument screwdriver. After a suitable interval allowing the coil to saturate to its surrounding controlled ambient environment, the sub assembly 140*a* may be rotated by means of the slot 1068 to bring the indicating hand 116 into alignment with the correct value on the dial face 118 corresponding to the known ambient of a master comparator gauge. Similar adjustment slots may also be provided by apertures 747 of the back plate 150 to enable user correction or recalibration, which may be necessary as the devices age. For example, hygrometer coils may be particularly susceptible to drying out and suffering a calibration drift. Periodic saturation in a damp enclosure followed by a small rotary adjustment to a known comparator or assumed 100% saturation in a damp enclosure is a recommended way of reactivating and resetting bi-material hygrometer sensors.

Figure 17:
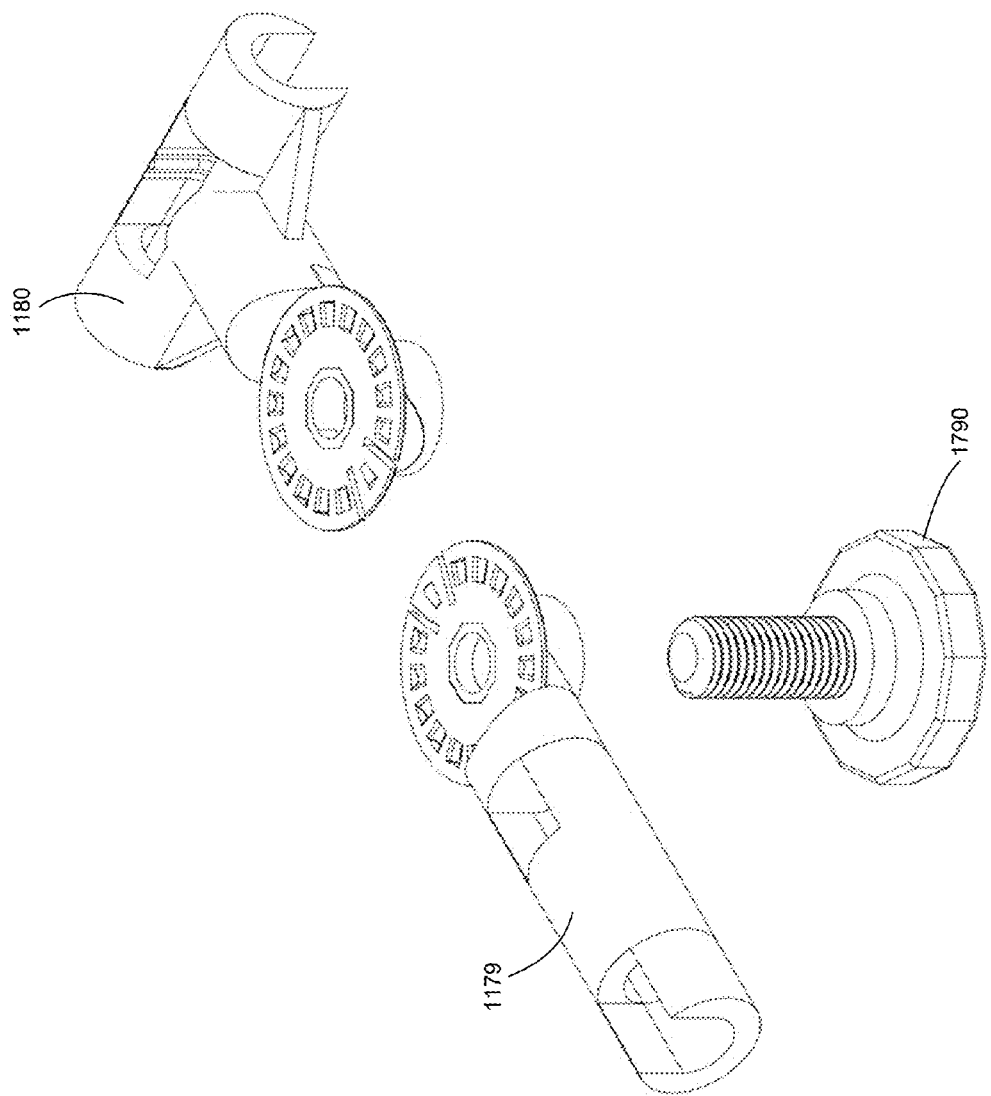
FIG. 17 shows a perspective view of an exemplary ratchet clutch for use in combination with an instrument encasing system.

FIGS. 11*a*-17 show various views of a three-axis external mount 1100 for use with instrument encasing systems 100. In the illustrated embodiment, the mount 1100 may include a swivel suspension plate 1388, a ratchet arm 1179, a ratchet knuckle 1180 and a clevis pin 1191 or thumb screw 1790 (FIG. 17). The ratchet arm 1179 may be connected to swing arm 1182, for example, by knurls 1195 provided on the swing arm 1182 to enable force fitting with the ratchet arm 1179. The ratchet arm 1179 and ratchet knuckle 1180 may each include a self-sprung bladed pawl 1181 and set of grooves that enable rotational engagement with one another in discrete rotational increments. The ratchet arm 1179 and ratchet knuckle 1180 may be attached to one another by way of a clevis pin 1189 whose groove 1191 engages an annulus rim 1110 provided on the ratchet knuckle 1180. Alternatively, or additionally, the ratchet knuckle 1180 may include threading that engages a thumb screw 1790. A suspension arm 1183 may be inserted into the ratchet knuckle 1180 and retained in place using by a blade 1121 provided on the ratchet knuckle 1180 that engages a groove 1120 on the suspension arm 1120. Alternatively, or additionally, a suspension arm 1283 may include one or more knurls 1284 to provide for a force fit with the lower trunnion block 1384*b* (FIG. 13).

FIG. 13 details the principles of a mounting plate that substitutes for the mounting brackets 160 and 860 of FIGS.

8 and 9. The plate 1388 may mount to a 'Z' shaped swing arm 1293 wherein the swing arm 1293 may rotate about its anchorage in a mullion or wall bracket 1385 and the swivel plate 1388 can rotate about the other free end of the swing arm 1293. Alternatively, or additionally, the swing arm 1293 may be substituted by the three axis assembly shown in FIGS. 11-13 that consists of a swing arm 1182, a suspension arm 1183 and trunnions 1384*a-b*. The third axis may allow the instrument casing 100 to be rotated in two axes—the same axis provided by the swing arm 1293 and also to be rotated backwards and forwards on a clutch as shown in FIG. 15. As shown, the clutch may act like a self-sprung ratchet. A stowage clip bracket 1399 may also be provided to secure the swing arm when not in use.

A wall bracket 1385 may receive one end of a swing arms 1293 and 1195 of either a two or three axis design. The swivel plate 1388 may have a similar three point mount used on the 'T' shaped suspension bracket 160. The upper two mounting points 1342*a-b* may be arranged to spring to ease the assembly or removal from the shallow captivating wall around the periphery of the swing plate 1388. The upper two mounting points 1342*a-b* may be lightly pressed forward by exerting pressure to them on the back outside face of the swivel plate 1388 to assist with making the suspension lobes 1357*a-b* engage with slots 1342*a-b*.

FIGS. 11*a*, 11*b* and 17 show perspective views of an exemplary ratchet clutch for use in combination with an instrument encasing system. A swing arm 1182 may press fit by means of knurls to a ratchet arm 1179. The ratchet arm 1179 may define one half of a clutch plate system and may include a self-sprung leaf bearing a rib piece 1181. The center of the clutch plate may have a hole for aligning and tensioning to the ratchet knuckle 1180.

The ratchet knuckle 1180 may define the other half of the clutch plate system. The ratchet knuckle 1180 may have a hole through the clutch center that may be either threaded to receive a thumb wheel device 1790 or may include an internal annulus rib to retain a clevis pin 1189 via its groove 1191 (FIG. 11*a*). Both the clevis pin 1189 and/or the thumb wheel 1790 may control the tension of the clutch and hold the parts together to provide a third axis of rotation.

Two discs 1181*a-b* may each include annular recesses and a rib on a spring leaf that may be integrally molded to ratchet knuckle 1180 and ratchet arm 1179. The discs 1181*a-b* may be arranged so that the rib on a spring leaf of each part will assemble diametrically opposite to the other.

The clutch assembly may be assembled by means of registering the assembly between trunnions 1384*a-b* on the swing plate 1388 and passing the top section swing arm 1183 through the lower trunnion 1384*b*, into the ratchet knuckle 1120 via a hole formed by opposing molded 'U' sections. The center 'U' may include a spring blade formed within it that also bears an internal rib. The rib may retain the top section of the suspension arm 1183 via a groove 1120. Alternatively, the suspension arm 1283 may be held in situ to the lower trunnion 1384*b* by a force fit knurl or similar mechanism.

Another embodiment of an instrument encasing system 200 is shown in FIG. 2 in an exploded view. This version 200 may include an alternate styling commonly known as a 'Windlass' because the external shape imitates the device used on boats for sheet (rope) tension control. Similar to the embodiment shown in FIG. 1, the instrument casing system 200 illustrated in FIG. 2 may include an=combined plastic housing and outer case 220 and gauge mount plate 222 that may include one or more calibrated dials, gauges and the like 240*a-c*; a front lens 214; a lens compression support thread 212; a dial 218; indicating hands 216; one or more stabilization weights 230; a back plate 250, and a suspension bracket 260.

In addition, the instrument encasing system 200 also may have a front bezel surround 210. Because front bezel surround 210 has a shape that is not easy to produce in pressed or spun metal sheet materials, the front bezel surround 210 may be a thermoplastic bezel of electro-platable grade and coated by Physical Vapor Deposition (PVD) or other metallic compounds. For example, the front bezel surround 210 may be produced by injection molding of electroless-platable Acrylonitrile Butadiene Styrene (ABS) and Physical Vapor Deposition (PVD) of hard Zirconium Nitride (ZrN) to provide a polished metallic appearance similar to a metal outer casing 110.

The front bezel surround 210 may provide a snap clip assembly to the inner housing 220 via one or more clips 209 provided on the front bezel surround 210. The system 200 may also include a lens compression support thread 211 and an optional external compression support 219 for further securing the front bezel surround 210, lens 214, dial 218, etcetera to one another. The lens support 211 may be cellular foam thread of dual function to absorb tolerance variations in the assembled stack of components and provide pressure point dispersal to prevent lens breakage.

In the embodiment shown in FIG. 2, the inner housing 220 may include a channel 221 that receives the back plate 250. Alternatively, or additionally, the back plate 260 may be screw assembled to the inner housing 220 and may partially extend from the rear limit of the housing 220 to control spacing from the wall mount surface for stability and ventilation and/or to also co-operate with a triple screw head mount system extending in the same axis as the cased instrument such that the triple headed tubes are able to provide support and retention to the system 200 in a fixed and predetermined aligned aspect.

Figure 3:
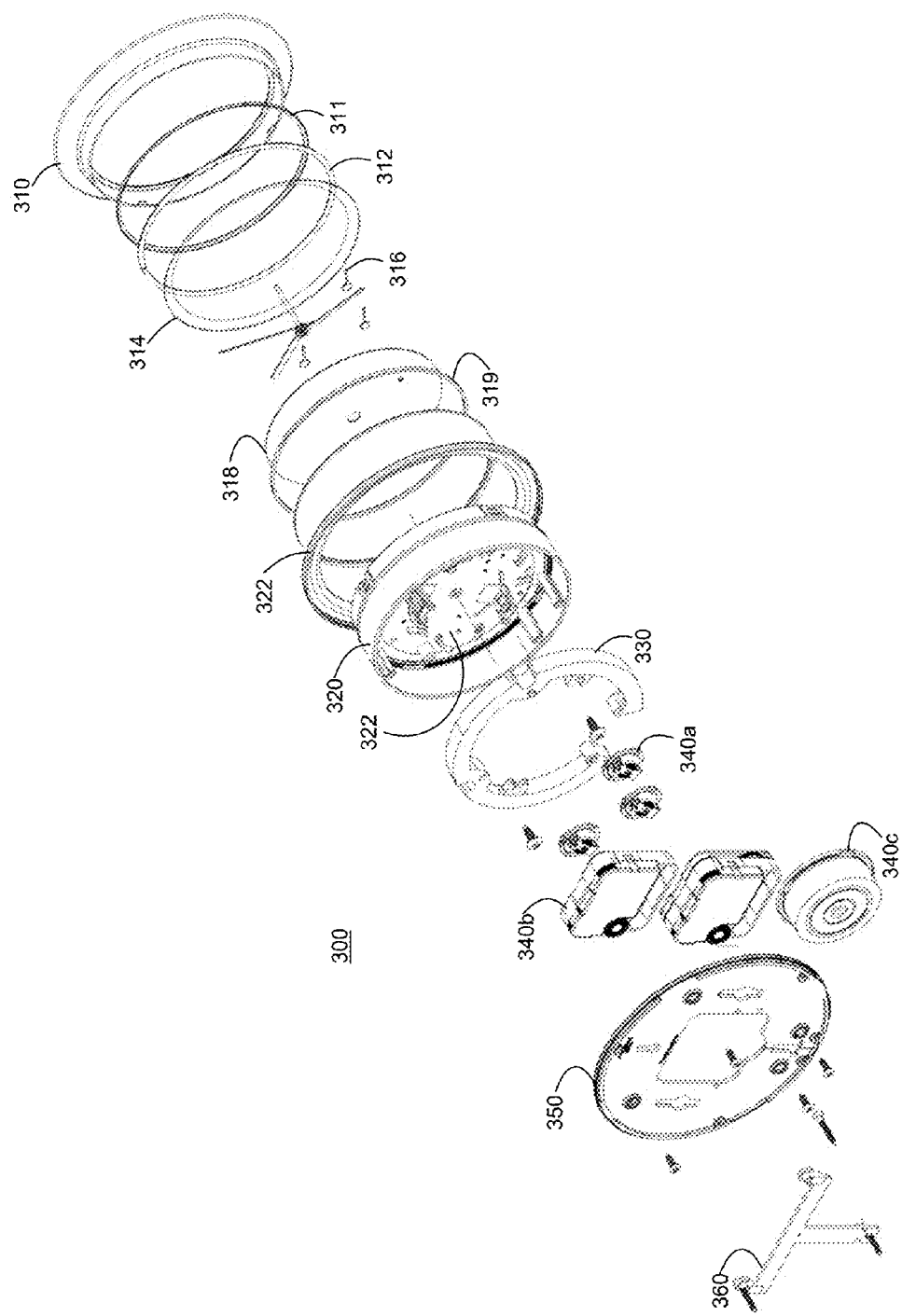
FIG. 3 shows an exploded view of another exemplary instrument encasing system.
Figure 4C:
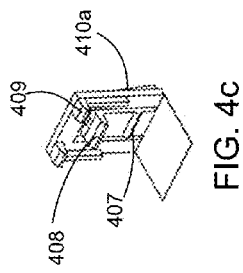
FIGS. 4a-f show partial perspective views of exemplary inner housings and components thereof for use in an instrument encasing system.
Figure 4D:
Figure 4E:
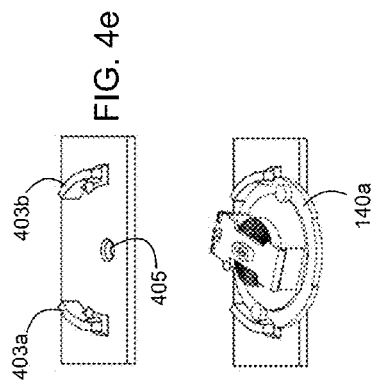
Figure 4F:
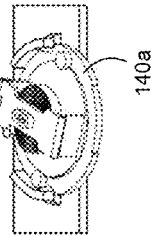
Figure 4A:
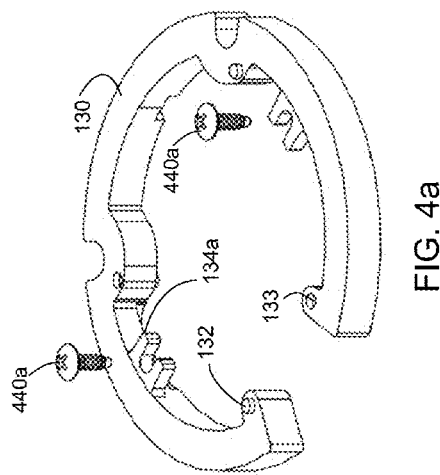
Figure 4B:
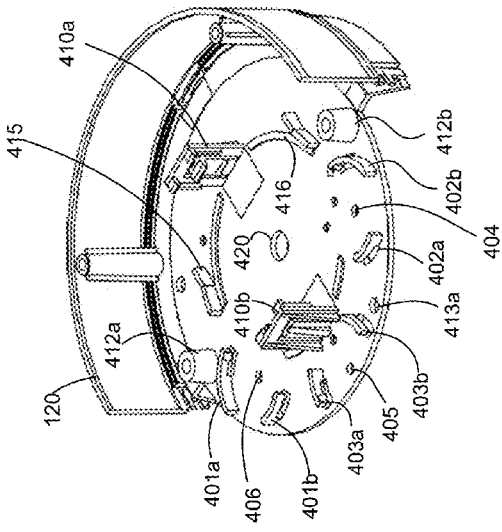

FIG. 3 shows an exploded view of another exemplary instrument encasing system 300 having an outer casing 322 and a front bezel 310 is shown. This embodiment 300 combines the appearance styling of the embodiment 200 shown in FIG. 2 with the capabilities of the embodiment shown in FIG. 1. As illustrated, the outer casing 322 may receive the variable geometry back plate 350 as described above and also may provide surface and coloring treatments that are not possible on the plastic inner housing 220 shown in FIG. 2.

Figure 20B:
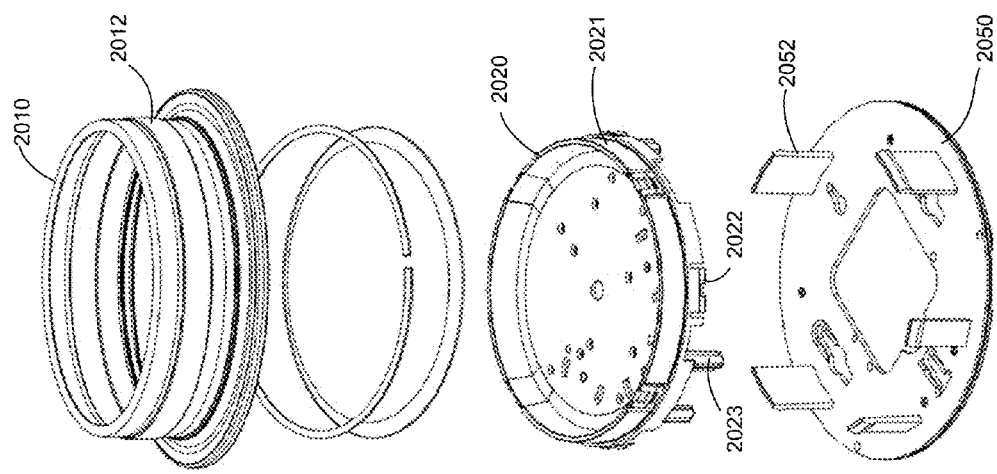
Figure 20A:
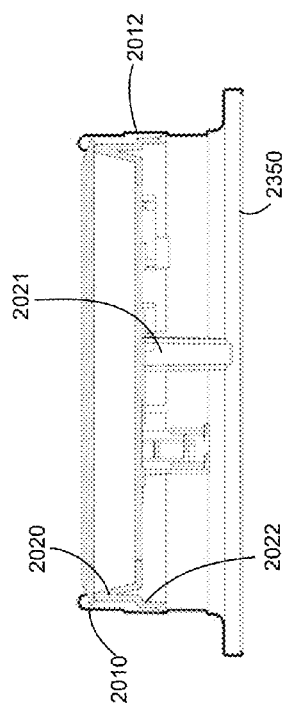

FIGS. 19-20 show alternate embodiments of various components of the encasement system 100. An alternate embodiment for an inner housing 120 is shown in FIG. 19. In this embodiment, the inner housing 1920 includes one or more spring limb side extensions 1922 or feet. The effective outer radius of the feet may be the same as that of the back plate 150 (FIG. 7). These side extensions may perform in a similar manner to the variable geometry of the back plate 150. For example, they may be biased towards the center so as to be able to be then released into the rear groove of the outer case 110, thus forming a self or clip assembled inner and outer casing arrangement. As a result, a variable geometry inner housing 1920 then may provide a rear flange for receiving a geometrically static back plate 1950. Holes in these feet 1922 may coincide with optional case flange screw holes for high security wall fixing and also may enable a simple rigid bar insertion to assist with disassembly by levering the feet 1922 towards the center and liberating the inner housing 1920 from the outer case 110 rear flange channel. The back plate 1950 may be clipped by upstands 1914 to the apertures 1915 or screwed to the pillars 1916.

Another variation including a waistline assembly principle is illustrated in FIG. 20. In the illustrated embodiment, the outer casing 2010 may be modified by spinning an enlarged waistline diameter 2012 to the side wall.

The inner housing 2020 may have a reduced depth side wall 2021 that may have spring clips 2022 that may deflect during assembly and snap into the inside of the waistline 2012. For example, three or four equidistantly spaced spring clips 2022 may be provided.

In some embodiments, back plate 2350 may be fitted either by means of screws to pillars 2021 or by adding molded upstanding clip 2052 to clip into the waistline 2012.

As described above, exemplary back plate 150 shown in FIG. 7 may be temporarily changed in shape (variable geometry) for entrapped hidden assembly and to become part of a rigid assembled system 100. The method described in the foregoing is one way the principal can be achieved by squeezing the plate laterally across a radial slot as in FIG. 7. In addition, other embodiments of the back plate 150 may provide a variable geometry component in other ways.

For example, variable geometry may be achieved by various molded plates 2150 that may provide localized stress relief via alternate geometry slots, shown in the embodiment illustrated in FIGS. 21a-c. As shown, the back plate 2150 may include section creases that enable fold, insert and unfold techniques to be employed to alter the geometry of the back plate 2150.

In the illustrated embodiment, the back plate 2150 may have countersunk screw holes 2172 that may be situated on hinge flaps 2170. The hinges 2170 may be provided by four reduced section channels 2174 provided in the plate 2150 molding. After inserting the lens support 211, lens 114 and dial plate 118 into the outer casing 110, the back plate 2150 may be aligned with the four screw holes 2172 coincident to the pillars 2180 of the inner housing 110. Screw hole flaps 2170 may be bent forward by finger pressure or the like and may be inserted into the rear of the case flange. Next, the back plate 2150 may be pressed forward into the case rear enabling the screw hole flaps 2172 to expand or slide into the case flange channel 2116 and become partially entrapped by the channel 2116. Four screws 2184 may be inserted into the countersunk molded holes 2172 and further into the screw pillars 2180.

The tightening of the screw may draw the back plate 2150 to the dial plate pillars 2180. As a result of the screw tightening process, the entrapped flaps 2170 may react against the inside edge of the reverse formed back face of the channel 2116 to create a fulcrum point from which the screw tightening process causes the flaps 2170 to leverage the back plate 2150 and flaps back to their molded co-linear or flat shape. The result of this leverage action may be to force the inner housing 110 firmly into contact with the lens 114, lens support ring 112 and outer case 110 to complete the assembly process.

The four screws 2184 also may be dispensed with if the screw pillars 2180 of the inner housing 110 modified to pass through the four flap holes 2170 are suitably enlarged so that the emerging ends of the screw pillars 2180 may be modified to have undercut heads that clip past the flap holes. This may be achieved, for example, by applying pressure to the rear of the assembly 100 in place of the effect of four deleted screws.

This alternate back plate notations 1950, 2050 and/or 2150 may utilize any of the suspension options as described herein, or other suspension options.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An instrument encasing system comprising:
   an outer housing;
   an inner housing having a leading edge and a mounting plate, the mounting plate including one or more mount points for receiving an instrument, the outer housing receiving the leading edge of the inner housing;
   a back plate that encloses the instrument in the inner housing, the back plate including at least two mounting apertures; and
   a suspension bracket having at least two protrusions that engage the at least two apertures of the back plate, where the suspension bracket has a T-shape having a cross bar and base, where the at least two protrusions are provided along the cross bar.

2. The instrument encasing system of claim 1, where the at least two protrusions are tubular bosses.

3. The instrument encasing system of claim 2, where the back plate further includes surrounds to the at least two apertures, the surrounds comprising a ramp and plateau that engage the tubular bosses.

4. The instrument encasing system of claim 1, where the suspension bracket includes either an aperture aligned to the center of the outer housing, a notch aligned to the center of the outer housing, or both.

5. The instrument encasing system of claim 1, where the suspension bracket is coupled to a swing arm that provides at least one axis of rotation.

6. The instrument encasing system of claim 1, where the suspension bracket includes a third protrusion, the third protrusion provided along the base of the suspension bracket.

7. The instrument encasing system of claim 6, where the third protrusions is a T-shaped boss.

8. The instrument encasing system of claim 6, where the third protrusion is a T-shaped boss that engages a third mounting aperture in the back plate and where the back plate further includes a surround to the third aperture, the surround comprising a ramp.

9. The instrument encasing system of claim 1, where at least one of the protrusions is a tubular boss.

10. The instrument encasing system of claim 1, where the at least two protrusions are tubular bosses provided along the cross bar and the suspension bracket includes a third protrusion that is a T-shaped boss provided along the base.

11. The instrument encasing system of claim 10, where the tubular bosses and T-shaped boss, when engaged with the mounting apertures, hold the back plate substantially parallel to a wall mount surface to which the suspension bracket is attached.

12. The instrument encasing system of claim 1, further comprising a stabilization weight attached to the inner housing.

13. The instrument encasing system of claim 12, where the inner housing has at least two bosses and where the stabilization weight includes at least two lugs for receiving screws that also engage the at least two bosses of the inner housing.

14. The instrument encasing system of claim 12, where the stabilization weight is a metal.

15. A method for providing an instrument encasement system comprising:
   providing an outer housing having a surface;

providing an inner housing having a leading edge and a mounting plate, the mounting plate including one or more mount points for receiving an instrument, the outer housing receiving the leading edge of the inner housing;

abrading the surface of the outer housing; and applying a Physical Vapor Deposition (PVD) coating to the surface of the outer housing after the abrading step.

16. The instrument encasing system of claim 15, where the outer housing is either mild steel, stainless steel or aluminum.

17. The instrument encasing system of claim 15, where the PVD coating comprises at least one of Zirconium Nitride (ZrN), Titanium Nitride (TiN), Titanium nitride (TiN) with Titanium carbon nitride (TiCN), Titanium Aluminum nitride (TiAlN), Chromium nitride (CrN), Aluminum Titanium nitride (AlTiN), Titanium Aluminum Carbon Nitride (TiAlCN), and Aluminium Chromium Nitride (AlCrN).

18. The instrument encasing system of claim 15, where the outer housing is plastic.

19. The instrument encasing system of claim 15, further comprising the step of introducing, during the applying step, at least one of oxygen, acetylene and nitrogen.

* * * * *